United States Patent [19]

Steckel

[11] Patent Number: 5,780,401
[45] Date of Patent: Jul. 14, 1998

[54] NON-FLATING SLIP-ENHANCING ADDITIVES FOR COATINGS

[75] Inventor: Thomas F. Steckel, Chagrin Falls, Ohio

[73] Assignee: The Lubrizol Corporation, Wickliffe, Ohio

[21] Appl. No.: 818,043

[22] Filed: Mar. 14, 1997

[51] Int. Cl.$^6$ .................................................. C10M 133/16
[52] U.S. Cl. ............................................ 508/551; 508/555
[58] Field of Search ........................... 106/36; 508/551, 508/555

[56] References Cited

U.S. PATENT DOCUMENTS

| | | | |
|---|---|---|---|
| 3,362,839 | 1/1968 | Weindel | 106/270 |
| 3,458,346 | 7/1969 | Mitchell, Jr. et al. | 117/76 |
| 3,908,048 | 9/1975 | Kawanaka et al. | 427/377 |
| 4,275,146 | 6/1981 | Yoneyama et al. | 430/523 |
| 4,446,034 | 5/1984 | Kolbe et al. | 252/8.8 |
| 4,828,735 | 5/1989 | Minagawa et al. | 252/49.3 |
| 5,389,199 | 2/1995 | Awad et al. | 156/665 |

FOREIGN PATENT DOCUMENTS

| | | |
|---|---|---|
| 1081453A | 2/1994 | China . |
| 208630 | 12/1983 | Czechoslovakia . |
| 018947 | 11/1980 | European Pat. Off. . |
| 57-102317 | 6/1982 | Japan . |
| 60-087426 | 5/1985 | Japan . |
| 60-44352 | 10/1985 | Japan . |
| 61-219177 | 5/1986 | Japan . |
| 5112749 | 5/1993 | Japan . |
| 8059852 | 3/1996 | Japan . |
| 8260254 | 10/1996 | Japan . |
| 630330 | 10/1978 | U.S.S.R. . |

OTHER PUBLICATIONS

*Journal of Coatings Technology*, vol. 62, No. 791, Dec. 1990 "Development of New Additives to Improve Scratch Resistance and Impart Slip To Solvent-Based Coating Systems", by F. Fink et al.

Primary Examiner—Erma Cameron
Attorney, Agent, or Firm—Krishna G. Banerjee; David M. Shold

[57] ABSTRACT

The present invention is directed to coating additives useful as non-flatting slip-enhancing agents. The additives are the non cross-linked reaction products of (a) an amine represented by the formula $NR^1R^2H$ wherein each R is independently selected from the group consisting of hydrocarbyl groups and hydroxyalkyl groups; or by the formula $D-(NGH)_y$ wherein D is a multivalent organic radical having 2 to about 30 carbon atoms; each G independently is hydrogen, a hydrocarbyl group, or hydroxyalkyl group; and y is at least 2; provided that if D is an organic radical containing 2 carbon atoms and y is 2, at least one G must be a hydrocarbyl group of 1 to 30 carbon atoms; and (b) a carboxylic acid of the formula $B-(COOH)_z$, or a reactive equivalent thereof, wherein B is a direct link between two COOH groups, a mono- or a multivalent organic radical, and z is 1–5; wherein the resulting product contains at least 2 hydrocarbyl groups each having about 12 to about 30 carbon atoms.

The above compositions can enhance the slip properties of a coating composition while retaining the initial gloss.

21 Claims, No Drawings

NON-FLATING SLIP-ENHANCING ADDITIVES FOR COATINGS

BACKGROUND OF THE INVENTION

1. Field of the Invention

The present invention relates to coating compositions containing non-flatting slip-enhancing additives, and a process for preparing such compositions.

2. Description of Related Art

Slip is the relative movement between two objects that are in contact with each other. If an object is moved along a surface, there is a resistance acting in a direction opposite the movement. The resisting force is also called frictional force, friction resulting from the unevenness of the two surfaces in contact.

Coating systems are susceptible to damage when in contact with solid objects. Paint films, for instance, can be easily damaged during drying, when they have not yet fully cured. In the case of baking enamels, damage can occur when the films have not yet cooled. In addition, scratches, which are discontinuities on surfaces can cause attachment of air-borne contaminants and corrosive agents leading eventually to corrosion problems.

Slip additives provide some degree of protection against such damages. For example, in automotive coating applications, they protect the not fully hardened freshly applied enamels, and in can coatings, they protect the coating during filling and distribution.

The concepts of slip and mar (or scratch) resistance are very closely interrelated in that the same additive may perform both functions—impart slip and provide scratch resistance; in addition the principle underlying both is the same. A hard object touching a paint film containing an additive can be deflected due to the surface lubricity of the additive. This results in a greater apparent film hardness or scratch resistance.

A slip additive must fulfill several requirements. The additive needs to migrate to the film surface during the drying process, forming a film which not only adheres to the coating, but also favorably influences its flow and leveling properties. In addition, this film must have lubricating qualities, expressed as the ability to carry a load in a very thin layer.

Compounds based on silicone chemistry have been used as mar and slip additives for about 30 years. Examples of silicone-based slip additives include polydimethylsiloxanes, polyoxyalkylenesiloxane (polysiloxane/polyether) copolymers, and polyoxyalkylene methylalkylsiloxane copolymers.

A detailed description describing the concept of slip and mar and the developments of additives to improve scratch resistance and impart slip can be found in an article by F. Fink, et al., entitled "Development of New Additives to Improve Scratch Resistance and Impart Slip To Solvent-Based Coating Systems" in *Journal of Coatings Technology*, Vol. 62, No. 791, December 1990.

U.S. Pat. No. 3,362,839, Weindel, Jan. 9, 1968, discloses a coating composition comprising a petroleum wax; a polymeric material selected from the group consisting of olefin polymer, and an interpolymer containing ethylene and an ester selected from the group consisting of vinyl acetate and ethyl acrylate; and a small amount, sufficient to improve the slip characteristics, of the wax-polymeric composition of various N-substituted fatty amides, such as oleyl palmitamide and stearyl erucamide.

U.S. Pat. No. 3,458,346, Mitchell, Jr. et al., Jul. 29, 1969, discloses an article comprising a paper substrate, a moisture resistant film of polymer, selected from the group consisting of vinylidene chloride polymers, polyethylene and polypropylene superimposed on said substrate, and a slip coating on said film, said slip coating consisting essentially of a $C_{14}$ to $C_{22}$ fatty amide. The term "fatty amide" refers to a neutral derivative of the reaction of fatty acids and ammonia.

U.S. Pat. No. 4,275,146, Yoneyama et al., Jun. 23, 1981, discloses a photosensitive material which is characterized by at least one surface layer of the photographic photosensitive material containing an organic carboxylic acid amide of the formula

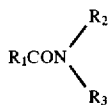

wherein $R_1$ represents a hydrocarbon group having 18 to 23 carbon atoms and at least one double bond and each of $R_2$ and $R_3$ represents a hydrogen atom or a lower alkyl group having 1 to 4 carbon atoms. The compounds used were disclosed to improve slip properties of photographic photosensitive materials without harming the photographic properties.

Japanese Laid-open Pat. Publication No. 5-112749, Nakatsuka et al., May 7, 1996, discloses a powdered polyethylene resin composition for powder paints, consisting of (A) 100 parts by weight of a resin mixture of ethylene-vinyl acetate copolymer and polyethylene, the content of said ethylene-vinyl acetate copolymer being 1 to 40% by weight, and (B) 0.02 to 0.5 part by weight of a fatty acid amide. When used in coating, the resulting coating film was disclosed to have good slip property with less reduction of the surface gloss. This patent discloses the common problem of gloss reduction when a fatty acid amide is added to a resin to improve the sliding property of the coating surface. This reduction in gloss is due to the bleeding out of the fatty acid amide. In order to solve this problem, improved methods of adding fatty acid amide are known in the art, and include methods of preventing the presence of an excess amount of the fatty acid amide in the resin by adding as little fatty acid amide as possible, and to disperse the fatty acid amide uniformly, for example those comprising dry-blending the fatty acid amide in the Henscel mixer, etc., at a temperature above the melting point of the fatty acid amide and below the melting point of the resin to provide the effect with the addition of a small amount of the fatty acid amide. Other methods comprise dissolving the fatty acid amide in an organic solvent and blending the solution with the powdered resin and the like.

Japanese Laid open Publication No. 5-112749, also discloses that it is not possible to sufficiently prevent the reduction of the surface gloss due to the bleeding out of the fatty acid amide by only presenting such improved addition methods of the fatty acid amide.

SUMMARY OF THE INVENTION

The present invention is directed towards overcoming the above-described disadvantages of the prior art that result in decreased surface gloss of the coating when using a fatty acid amide or a polyalkylene wax slip additive. The present invention provides a coating composition comprising a non-flatting slip-enhancing additive comprising the non cross-linked reaction product of:

(a) an amine represented by the formula:
(i) $NR^1R^2H$
wherein $R^1$ and $R^2$ are independently selected from the group consisting of hydrocarbyl groups and hydroxyalkyl groups represented by the formula

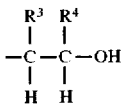

wherein $R^3$ and $R^4$ are independently hydrogen or a hydrocarbyl group; or (ii) D—$(NGH)_y$ wherein D is a multivalent organic radical having 2 to about 30 carbon atoms; each G independently is hydrogen, a hydrocarbyl group, or hydroxyalkyl group represented by the formula

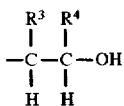

wherein $R^3$ and $R^4$ are defined as above; and y is at least 2; provided that if D is an organic radical containing 2 carbon atoms and y is 2, at least one G must be a hydrocarbyl group of 1 to 30 carbon atoms; and (b) a carboxylic acid of the formula B—$(COOH)_z$, or a reactive equivalent thereof, wherein B is a direct link between two COOH groups, a mono- or a multivalent organic radical, and z is 1–5; wherein the resulting product contains at least 2 hydrocarbyl groups, each having about 12 to about 30 carbon atoms.

The invention further provides a method for enhancing the slip properties while retaining at least 75% of the initial gloss in a coating composition containing a film-forming resin, comprising the steps of:

(I) forming a mixture comprising said resin and a non-flatting slip-enhancing additive comprising the non cross-linked reaction product of:
(a) an amine represented by the formula:
(i) $NR^1R^2H$ wherein $R^1$ and $R^2$ are independently selected from the group consisting of hydrocarbyl groups and hydroxyalkyl groups represented by the formula

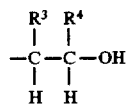

wherein $R^3$ and $R^4$ are independently hydrogen or a hydrocarbyl; or (ii) D—$(NGH)_y$ wherein D is a multivalent organic radical having 2 to about 30 carbon atoms; each G independently is hydrogen, a hydrocarbyl group, or a hydroxyalkyl group represented by the formula

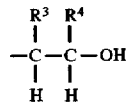

wherein $R^3$ and $R^4$ are defined as above; and y is at least 2; provided that if D is an organic radical containing 2 carbon atoms and y is 2, at least one G must be a hydrocarbyl group of 1 to 30 carbon atoms; and (b) a carboxylic acid of the formula B—$(COOH)_z$ or a reactive equivalent thereof, wherein B is a direct link between two COOH groups, a mono- or a multivalent organic radical or a reactive equivalent thereof and z is 1–5; wherein the resulting product contains at least 2 hydrocarbyl groups, each having about 12 to about 30 carbon atoms; wherein the resulting product contains at least 2 hydrocarbyl groups, each having about 12 to about 30 carbon atoms; and (II) applying said mixture to a substrate to form a coating.

DETAILED DESCRIPTION OF THE INVENTION

One component of this invention is a non-flatting slip-enhancing additive. These materials are reaction products of an amine and a carboxylic acid or a reactive equivalent of a carboxylic acid.

One class of amines are secondary monoamines of the formula $NR^1R^2H$ wherein $R^1$ and $R^2$ are independently selected from the group consisting of hydrocarbyl groups and hydroxyalkyl groups represented by the formula

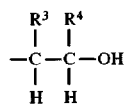

wherein $R^3$ and $R^4$ are independently hydrogen or a hydrocarbyl and the resulting product of the reaction of the amine and carboxylic acid comprises at least 2 hydrocarbyl groups, each having about 12 to about 30 carbon atoms.

The amines can be aliphatic, cycloaliphatic, aromatic, or heterocyclic amines. The amines can also contain non-hydrocarbon substituents or groups as long as these groups do not significantly interfere with the reaction of the amines with the acylating reagents of this invention. Such non-hydrocarbon substituents or groups include lower alkoxy, lower alkyl mercapto, nitro, interrupting groups such as —O— and —S— (e.g., as in such groups as —$CH_2CH_2$—X—$CH_2CH_2$— where X is —O— or —S—). When any R of the amine $NR^1R^2H$ is a hydrocarbyl group of 1 to 30 carbon atoms, the preferred hydrocarbyl group is one having 12 to 30 carbon atoms, and more preferably having 16 to 24 carbon atoms. Specific examples of secondary monoamines include diethylamine, di-n-butylamine, dicocoalkylamine, dioctadecylamine, di-(hydrogenated tallowalkyl) amine, dioleylamine, distearylamine, dilaurylamine, N-methyllaurylamine, N-methyloctylamine and didodecylamine. Many of the higher ($C_{12}$ and higher) alkyl amines are available commercially under the registered tradename Armeen™ marketed by Akzo Chemicals. When any R of the amine $NR^1R^2H$ is a hydroxyalkyl group represented by the formula

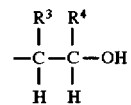

wherein $R^3$ and $R^4$ are independently hydrogen or a hydrocarbyl group of 1 to about 30 carbon atoms, the preferred $R^3$ and $R^4$ are independently hydrogen or a hydrocarbyl group of 1 to 2 carbon atoms. An example of a preferred amine comprising hydroxyalkyl groups is diethanolamine.

The amines of this invention can also be polyamines of the formula D—(NGH)$_y$ wherein D is a multivalent organic radical having 2 to 30 carbon atoms; each G independently is hydrogen, a hydrocarbyl group, or a hydroxyalkyl group represented by the formula

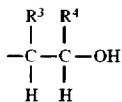

wherein R$^3$ and R$^4$ are defined as above; and y is at least 2; provided that if D is an organic radical containing 2 carbon atoms and y is 2, at least one G must be a hydrocarbyl group of 1 to 30 carbon atoms, wherein the product of the reaction of the amine and carboxylic acid comprises at least 2 hydrocarbyl groups having about 12 to about 30 carbon atoms.

The term "organic radical" may include any chemical group consisting of combinations of carbon, hydrogen and other heteroatoms such as nitrogen, and oxygen. The radical may have a valency of two (divalent) or higher (multivalent). Thus D can be a hydrocarbylene group of 2 to 30 carbon atoms or an alkylene polyamine represented by the formula:

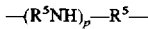

wherein R$^5$ is an alkylene group of 2 to 10 carbon atoms, and p is 1 to 10. When D is an alkylene polyamine, the resulting amine D—(NGH)$_y$ is also an alkylene polyamine. Examples of such polyamines include ethylenepolyamines, butylenepolyamines, propylenepolyamines and pentylenepolyamines. Specific examples of such polyamines are diethylenetriamine (DETA), triethylenetetramine (TETA), tris-(2-amino-ethyl) amine, propylenediamine, trimethylenediamine, tripropylenetetramine, tetraethylenepentamine, hexaethyleneheptamine, and pentaethylenehexamine. An example of a triamine containing an alkyl group is N-tallowalkyl dipropylene triamine, commercially available under the registered tradename Triameen™ T, marketed by Akzo Chemicals. An example of a trifunctional amine having three primary amine functionalities is 4-aminomethyl-1,8-octanediamine (triaminononane), marketed by Monsanto. It is represented by the structure:

H$_2$N(CH$_2$)$_3$CH(CH$_2$NH$_2$)(CH$_2$)$_4$NH$_2$

The amines of this invention can also be diamines represented by the formula

wherein n is at least 2, and each R is independently hydrogen or hydrocarbyl, provided that if n is 2, at least one R must be hydrocarbyl. When both R groups are hydrogen, the diamines are of a homologous series, such as propylene diamine, butylene diamine, pentylene diamine, hexamethylene diamine etc. Examples of diamines where both R are not H include N-coco-1,3-diaminopropane, N-tallow-1,3 diaminopropane, N,N,N'-trimethyl-N'-tallow-1,3-diaminopropane, N-oleyl-1,3-diaminopropane, N,N,N'-trimethyl-N'-9-octadecenyl-1,3-diaminopropane, 3-tallowalkyl-1,3-diaminopropane, and 3-tallowalkyl-1,3-hexahydropyrimidine, all commercially available under the tradename Duomeen™ marketed by Akzo Chemicals. The preferred diamines of this invention are 1,6-diaminohexane, 3-tallowalkyl-1,3-diaminopropane, and triaminononane.

The amines of this invention can also be polyether diamines (also called polyglycol polyamines). The polyetherdiamines make up a family of products having repeating polyether backbone structures containing repeating ethylene oxide, propylene oxide, or mixed ethylene oxide/propylene oxide units such as polyoxyalkylene diamines represented by the formula

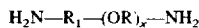

and

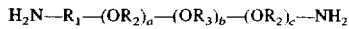

where R$_1$ is the alkylene group, R$_2$ and R3 are ethylene or propylene groups, and x, a, b, and c indicate number of repeating units of ethylene oxide and propylene oxide groups. These repeating units are present on average more than once.

Polyetherdiamines are sold under the trade name Jeffamine™ by Huntsman Chemical Company.

Other suitable diamines are the urea condensates of Jeffamine™ -D series products represented by the formula

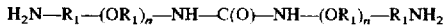

where R$_1$ is the alkylene group and n is on the average 5.6, such as Jeffamine™ DU-700.

The carboxylic acids used to prepare the non-flatting slip-enhancing additives of this invention can be represented by the formula B—(COOH)$_z$, or a reactive equivalent thereof, wherein B is a direct link between two COOH groups, a mono- or a multivalent organic radical, and z is 1–5, preferably 1–3. The carboxylic acids include aliphatic and aromatic carboxylic acids as well as polycarboxylic acid compounds having multiple carboxylic acid functionalities or reactive equivalents thereof, such as esters, anhydrides or acyl halides. Monocarboxylic acids which may be used have the formula RCOOH, wherein R is a hydrocarbyl group, preferably an aliphatic group. Preferably R contains from 1 to 30 carbon atoms. Examples of aliphatic carboxylic acids include formic acid, acetic acid, propanoic acid, butanoic acid, decanoic acid, myristic acid, palmitic acid, oleic acid, stearic acid, isostearic acid, lauric acid, caprylic acid, capric and behemic acid. In an especially preferred embodiment, the carboxylic acid is a straight chain saturated 18 carbon carboxylic acid, namely stearic acid.

Compounds useful as the polycarboxylic acid in this invention can be selected from any aromatic, aliphatic or cycloaliphatic, straight chain or branched chain, saturated or unsaturated dicarboxylic acid which have at least 2 carbon atoms, and more preferably 3 to 40 carbon atoms. Examples of these are oxalic acid, malonic acid, succinic acid, glutaric acid, adipic acid, pimelic acid, suberic acid, sebacid acid, azelaic acid, undecanedioic acid, 1,11-undecanedicarboxylic acid, dodecanedioic acid, hexadecanedioic acid, docosanedioic acid, maleic acid, fumaric acid and the like either alone or mixtures thereof. The term "dicarboxylic acids" is also used to include hydroxy substituted dicarboxylic acids. Representative of hydroxy substituted dicarboxylic acids are tartaric acid, citric acid and hydroxyisopthalic acid.

Dicarboxylic acids can also include the substituted succinic acids represented by the formula

wherein R is a hydrocarbyl group, including an olefin polymer-derived group formed by polymerization of such monomers as ethylene, propylene, 1-butene, isobutene, 1-pentene, 2-pentene, 1-hexene, and 3-hexene. Such groups usually contain 30 to 200, more often up to about 100 carbon atoms.

Also useful are oligomers of fatty acids which are substantially comprised of dimerized fatty acids. They are normally called "dimer acids", and are made by the thermal coupling unsaturated vegetable acids. They are available from Emery, Westvaco, Henkel, Unichema and other companies. Trade names of these dimer acids include Empol™ from Henkel Corporation, and Pripol™, from Unichema International. Illustrative examples of branched dimer acids are Empol™ 1004, Empol™ 1008, Empol™ 1018, Empol™ 1016. Dimer acids are described in U.S. Pat. Nos. 2,482,760, 2,482,761, 2,731,481, 2,793,219, 2,964,545, 2,978,468, 3,157,681, and 3,256,304.

In addition to the dicarboxylic acids, acids containing more than two carboxylic acid groups are also useful. Representative examples of these polybasic acids are trimellitic acid, trimesic acid, citric acid, 1,2,3,4-butanetetracarboxylic acid and the like. Polymerized polybasic acids which contain more than two carboxylic acid groups are also included in the definition of polybasic acids. The polymeric polybasic acids with 3 carboxylic acid groups are known as "trimer acids". These trimer acids are commercially available under the trade name Empol™ from Henkel Corporation-Emery Group, and Unidyme from Union Camp Corporation. Representative examples of these trimer acids are Empol™ 1040, Empol™ 1041. Polybasic acids which are mixtures of di, tri, tetra, penta, and hexacarboxylic acids are also useful for this invention.

Polyacid reaction products of unsaturated vegetable acids with acrylic acid and maleic anhydride are available from Westvaco under the product names Diacid™ 1550 and Tenax™ 2010, respectively. Another useful vegetable derived acid is 12-hydroxystearic acid, which can provide both carboxy and hydroxy functionality to the polyester.

The non-flatting slip-enhancing additives of this invention will contain at least two hydrocarbyl groups of 12 to 30 carbon atoms each. These hydrocarbyl groups can come from either the amine component alone, the carboxylic acid component alone or one each from the amine and carboxylic acid components. Moreover, the additives should not be the result of cross-linking or polymerization reaction between two molecules, each having multiple amine or carboxylic acid functionalities. Thus, both the amine component and the acid component should not at the same time contain reactive functionalities greater than two.

Chemically, the non-flatting slip-enhancing additives of this invention can be amides, imides, imidazolines, oxazolines, amine salts, or mixtures containing these functionalities along with other non-nitrogen containing functionalities such as esters. For instance, in one preferred embodiment, 3 moles of stearic acid is reacted with one mole of diethanolamine to give a product primarily containing on average one amide and two ester functionalities in the same molecule, although trace amounts of carboxylic acid-amine salts may also be present. Typically, the additives are made by reacting the acid and amine components together at elevated temperatures (150°–210° C.) for several (2–8 hours) and removing the water of condensation. If desired, a small amount of water (e.g. 4%) can be included with the reactants.

Another component of the present composition is a film-forming resin. Film-forming resins may either be curable, for instance with the help of cross-linking agents, or they may be film-forming without the help of cross-linking agents, such as by air-drying (here oxygen can be the cross-linking agent) or by solvent evaporation. Polymers which can be employed as the resinous component of the composition include oil-free polyester resins, urethane resins, acrylic resins, alkyd resins, epoxy resins, unsaturated polyester resins, melamine-formaldehyde resins, urea-formaldehyde resins, and nitrocellulose.

Oil-free polyester resins are the reaction products of the esterification of di-or polyhydric alcohols with di- and polybasic acids or anhydrides. The term "polyester resins" here indicates saturated polyesters (as opposed to "unsaturated polyesters" which are later discussed) which are straight or branch-chained aliphatic or aromatic polymers bearing either hydroxyl or carboxyl groups but no ethylenic unsaturation. Saturated polyesters containing reactive functional groups (such as carboxylic acid or hydroxyl functionalities or their reactive equivalents) form films by condensation polymerization with other resin types such as amino formaldehyde resins, epoxies, or polyisocyanates that contain complementary reactive functional groups. Examples of di- and poly-hydric polyols used in the synthesis of polyester resins include ethylene glycol , 1,6-hexanediol, neopentyl glycol, diethylene glycol, triethylene glycol, 1,4-cyclohexane dimethanol, 2,2,4-trimethyl, 1,3-pentanediol, bisphenol A, trimethylol propane (TMP), pentaerythritol, and dipentaerythritol. Examples of acids and anhydrides used for polyester synthesis include benzoic acid, pelargonic acid, succinic acid, adipic acid, azelaic acid, succinic anhydride, phthalic anhydride, isophthalic anhydride, trimellitic acid, and trimellitic anhydride.

Unsaturated polyesters, on the other hand, are characterized by vinyl unsaturation in the polyester backbone. These unsaturated polyesters are obtained by polymerizing unsaturated polycarboxylic acids or anhydrides with polyhydric alcohols using known methods. Examples of the unsaturated polycarboxylic acids include fumaric acid, maleic anhydride, and maleic acid. Examples of polyhydric alcohols include ethylene glycol, propylene glycol, diethylene glycol, glycerol, trimethylol propane, trimethylol ethane, pentaerythritol and bisphenol A.

Polyurethane resins form when a di- or polyisocyanate group (—NCO)-bearing intermediate reacts with a di- or polyhydroxyl-bearing species. The species used to react with the isocyanate functionality can be described as any hydrogen donor bearing two or more active hydrogens. Although there is a large array of hydrogen donors for use by the paint chemist in the preparation of polyurethane coatings, hydroxyl-based systems are used almost exclusively. The most common of these are hydroxylated acrylics, hydroxylated (saturated) polyesters, epoxies and other polyether-based polyols, polycarprolactone-based polyols, alkyds, cellulosics, castor oil derivatives, and polyamides, phenolics and amino systems. The more common isocyanate-terminated species available are the aliphatics, hexamethylene diisocyanate, isophorone diisocyanate and the aromatic species, toluene diisocyanate and diphenylmethyl diisocyanate.

Acrylic resins are obtained by polymerizing a suitable combination of a functional group-containing monomer and another copolymerizable monomer in an ordinary manner. The polymerization temperature is ordinarily between 60° C. and 100° C. and polymerization time is usually 3 to 10 hours. Examples of the functional group-containing monomers include hydroxyl group-containing monomers such as beta-hydroxyethyl acrylate, beta-hydroxypropyl acrylate, beta-hydroxyethyl methacrylate, beta-hydroxypropyl methacrylate, N-methylol acrylamide and N-methylol methacrylamide; carboxyl-group containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxymethylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerized with these functional group-containing monomers include olefinically unsaturated monomers such as ethylene, propylene and isobutylene, aromatic monomers such as styrene, vinyltoluene and alphamethylstyrene; esters of (meth)acrylic acid and alcohols of 1 to about 18 carbon atoms such as methyl (meth)acrylate, ethyl (meth)acrylate, propyl(methacrylate), n-butyl(meth)acrylate, isobutyl(meth)acrylate, cyclohexyl (meth)acrylate, 2-ethylhexyl(meth)acrylate and lauryl(meth) acrylate; vinyl esters of carboxylic acid of 2 to 11 carbon atoms such as vinyl acetate, vinyl propionate and vinyl 2-ethylhexylic acid; as well as vinyl chloride, acrylonitrile and methacrylonitrile. They may be used either alone or in the form of a mixture of two or more.

Alkyd resins are obtained by reacting a dihydric or polyhydric alcohol and a polybasic acid or anhydride in the presence of a drying oil using known techniques. Examples of the dihydric or polyhydric alcohols include glycerol, pentaerythritol, sorbitol and diethylene glycol. Examples of the polybasic acids or anhydrides include phthalic acid, isophthalic acid, maleic anhydride, fumaric anhydride, non-conjugated linoleic acid, oleic acid, adipic acid, azelaic acid, sebacic acid, tetrachlorophthalic anhydride, and chlorendic anhydride. Examples of the drying oils include soybean oil, linseed oil, dehydrated castor oil, non-oxidizing castor and coconut oils, tung oil, oitica oil, fish oil, sunflower oil, walnut oil, safflower seed oil and tall oil. These alkyd resins may be produced, for example, by direct fusion of glycerol, phthalic anhydride and drying oil at a temperature in the range of from about 210° C. to bout 235° C. The amount of drying oil varies depending on the intended use.

The epoxy resins include any one of a number of well known organic resins which are characterized by the presence therein of the epoxide group

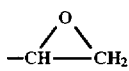

A wide variety of such resins are available commercially. Such resins have either a mixed aliphatic-aromatic or an exclusively non-benzenoid (i.e., aliphatic or cycloaliphatic) molecular structure.

Melamine-formaldehyde and urea-formaldehyde resins are useful in the coatings industry. These resins are used primarily as cross linkers for hydroxyl-bearing resins. As cross-linkers, they are usually not the sole binder in surface coating; they are generally a minor resinous component usually comprising less than about 35 percent of the total non-volatile binder by weight. The term "binder" refers to the combined weight of the resin and the crosslinking agent. Melamine-formaldehyde and urea-formaldehyde resins are the products of the reaction of formaldehyde with melamine or with urea. Either melamine or urea resins (or mixtures thereof) may be used as the cross-linking agents, although the melamines generally provide a greater degree of cross-linking. Useful melamine and urea resins are the alkoxy alkyl and the alkylol melamines and ureas. Specific examples include: alkoxymethyl melamines and ureas in which the alkoxy groups have 1-4 carbon atoms such as hexaalkoxy (methoxy, ethoxy, propoxy, butoxy and mixed alkoxy) methyl melamines and dialkoxy methyl ureas; and the alkylol melamines and ureas such as hexamethylol melamine and dimethylol urea. These cross-linking agents are particularly useful when the cross-linkable resin is an alkyd resin, a polyester resin, an epoxy resin or an acrylic resin.

Cellulose resins are another class of resins used in the coatings industry. Although the resins are synthetic, they are produced from the natural polysaccharide polymer cellulose, which is derived from cotton linters or wood pulp. Cellulose resins include cellulose esters including nitrocellulose, carboxylic esters of cellulose, such as cellulose acetate, and cellulose ethers, such as hydroxyethyl cellulose. Nitrocellulose is made by nitrating cellulose with a mixture of nitric and sulfuric acids in the presence of water. Nitrocellulose lacquers are formulated by suitable blending of nitrocellulose resins and solvents. Base nitrocellulose resin is generally blended with other resins and plasticizers to give satisfactory compositions. Nitrocellulose has good compatibility with other resin systems. Thus, acrylics, phenolics, vinyls, epoxies, natural resins, amino resins and alkyds are used to upgrade performance and durability of nitrocellulose.

Pigments may optionally be included in the compositions of this invention. Suitable pigments which can be included in the compositions of this invention are opacifying pigments normally used in paint and coating formulations, including titanium dioxide, phthalocyanine blue, carbon black, as well as chrome yellows, greens, oranges, mixed metal oxides, ceramic pigments and the like. Preferred pigments include titanium dioxide, phthalocyanine blue and green, red iron oxides, quinacridone red and lampblack. The amount of pigment, if present, is generally 0.05 to 5.0 times the amount (on a weight basis) of the resin.

An excellent source describing the chemistry, uses and applications of various resins and additives used in coatings is *Protective Coatings—Fundamentals of Chemistry and Compositions* by Clive H. Hare, Technology Publishing Company, Pittsburgh, Pa.(1994).

The following examples illustrate the preparation of various non-flatting slip additives of this invention.

The acid and base neutralization numbers are determined using standard titration techniques. Descriptions of these analyses follow:

Acid Neutralization Number: The sample is dissolved in a (1:1) by volume toluene/isopropanol mixture). Approximately 10 mL of water is added and the sample is titrated with approximately 0.1N NaOH solution to a phenolphthalein endpoint.

Base Neutralization Number: The sample is dissolved in a (1:1) by volume toluene/isopropanol mixture). Approximately 10 mL of water is added and the sample is titrated with approximately 0.1N HCl solution to a bromophenol blue endpoint.

Amount of sample: The amount of sample used for analysis depends on the expected value for the acid or base number. For an acid or base number of about 10, about 0.4 g sample is used. For acid or base numbers of less than 1, about 1.25 g sample is used.

EXAMPLE 1

A 500 mL flask equipped with stirrer, thermal well, subsurface $N_2$ inlet and a Dean-Stark trap is charged with 173.2 g (0.638 mole) of stearic acid. Diethanolamine (23.1 g; 0.22 mole) is then added over 30 minutes at 90° C. $N_2$ is purged through at 2.8 L/hr and the reaction mixture is further heated to 150° C. in 0.8 hr, and then to 170° C. in 0.5 hr. The reaction mixture is held at 170° C. for 2 hours and then heated to 205° C. in 0.25 hr. A total of 10 mL of water is collected in the trap. The reaction mixture is held at 205°–209° C. for 2.75 hr. Acid Neutralization number (NNA) is 13.7. The reaction mixture is further heated at 210° C. for 4 hr. The reaction mixture is filtered at 110° C. using 13 g of filter aid. The filtrate is collected as the product. On cooling, the material solidifies at about 53° C.

EXAMPLE 2

Substantially the same procedure as example 1 is used, except that 176.5 g (0.649 mole) of stearic acid and 34.95 g of diethanolamine (0.333 mole) are used. Ten mL of water is collected in the trap. After filtering at 105° C. using 9 g of filter aid and collecting the filtrate as the product, the material solidifies at 49° C.

EXAMPLE 3

Substantially the same procedure as example 1 is used, except that isostearic acid (183.55 g; 0.638 mole) is used instead of stearic acid and 23.1 g (0.22 mole) of diethanolamine is used. Final temperature of the reaction is 205°–210° C. where reactants are held for 2 hours. About 11 mL of water is collected in the trap. The reaction mixture is filtered at 100° C., using 13 g of filter aid and the filtrate is collected as the product, which is a liquid at room temperature.

EXAMPLE 4

Substantially the same procedure as example 1 is used except that the amine used is dicocoamine (128.7 g; 0.33 mole) and 98.4 g (0.362 mole) of stearic acid is used. Upon completion of the reaction, acid neutralization number is 14; base neutralization number (NNB) is 5. After filtration of the reaction mixture at 107° C., and collecting the filtrate as product, the material soldifies at less than 30° C.

EXAMPLE 5

Substantially the same procedure as example 1 is used except that the amine used is Armeen™ 2HT (di(hydrogenated tallow)amine) 129 g; 0.26 equivalent) and 73.8 g (0.27 equivalent) of stearic acid is used. About 3 mL of water is collected in the trap. Base neutralization number is about 15. Following filtration at 100° C. using 14 g filter aid, and collecting the filtrate as the product, the material solidifies at about 51°–53° C. upon cooling.

EXAMPLE 6

Substantially the same procedure as example A-1 is used except that the amine used is 1.6-diaminohexane (42.2 g; 0.73 equivalent), and 184.7 g of stearic acid (0.7 equivalent) is used. Final temperature of the reaction is 150° C., where reactants are held for 10 hr. About eleven mL of water is collected in the trap. Final base number is about 7, acid number about 1. The reaction mixture is collected as the final product without filtration. On cooling, the material solidifies at 130° C.

EXAMPLE 7

Substantially the same procedure as example A-1 is used except that the amine used is Duomeen™ T (N-tallow-1,3-diaminopropane) (89.9 g; 0.5 mole) and 142 g (0.5 mole) of stearic acid is used. Final reaction temperature is 160° C., where reactants are held for a total of about 20 hours. About 7 mL of water is collected in the trap. Final NNB is about 40, and NNA is about 38. The reaction mixture is collected as the final product without filtration. On cooling, the material solidifies at about 54° C.

EXAMPLE 8

Substantially the same procedure as example A-1 is used except that the amine used is Triaminononane (4-aminomethyl-1,8-octanediamine) (40.4 g; 0.7 equivalent) and 192.2 g (0.726 equivalent) stearic acid is used. Final reaction temperature is 165° C. where the reactants are held for 2.5 hr. A total of 11.5 mL of water is collected in the trap. The reaction mixture is collected as the final product without filtration. On cooling, the material solidifies at 95° C.

Several of the additives are evaluated separately in nitrocellulose lacquer, a polyester-melamine gloss white coating, a polyester-melamine clear coil coating, and a powder coating composition using a polyester resin.

The nitrocellulose lacquer formulation without the slip additives is shown in Table 1.

TABLE 1

| NITROCELLULOSE LACQUER FORMULATION* FORMULATION | |
|---|---|
| Component | % by Wt. |
| n-Butyl Acetate | 11.00 |
| Toluene | 18.00 |
| Ethyl Acetate | 18.00 |
| n-Butanol | 2.00 |
| Lackharz ™ V 295[1] (maleic based resin) | 6.00 |
| Collodiumwolle E 27[2] (nitrocellulose) (65% in isopropanol) | 17.00 |
| Jagalyd ™ E 42 (non drying alkyd) (60% in Xylene) | 23.00 |
| Methoxy Propanol | 3.00 |
| DOP (dioctyl phthalate) (plasticizer) | 2.00 |
| Total: | 100.00 |

*Lubrizol/Langer product literature
[1]Supplier: Robert Kraemer GmbH & Co., Germany
[2]Supplier: WNC-Nitrochemie GmbH, Germany The results of several standards as well as non-flatting slip additives used at 1% by weight of the above nitrocellulose lacquer formulation (i.e. about 99 g of above formulation and 1 g of additive) are shown in Table 2 below.

TABLE 2

Slip and Gloss measurements of Coating Compositions using Nitrocellulose lacquer formulation of Table 1 and various Non-Flatting Slip-Enhancing Additives.

| | Gloss (ASTM D-523) (100 = glossy) 0.003 inch film thickness | | Coefficient of Friction (ASTM D-4518) | |
|---|---|---|---|---|
| Composition[1] | 20° | 60° | Static | Kinetic |
| No additive | 75 | 94 | >0.3505[2] | >0.3505[2] |
| Lanco ™ TF 1780[3] | 25 | 67 | >0.3505[2,4] | >0.3505[2,4] |
| Byk ™ 300[5] @ 0.25% | 55 | 90 | 0.3251 | 0.2253 |
| Example 1 | 79 | 94 | 0.1506 | 0.1171 |
| Example 2 | 79 | 94 | 0.3393 | 0.3391 |
| Example 3 | 79 | 94 | 0.2337 | 0.2629 |
| Example 4 | 82 | 94 | >0.3505 | 0.3261 |
| Example 5 | 67 | 90 | 0.0719 | 0.0589 |
| Example 6 | 50 | 87 | >0.3505 | 0.2855 |

TABLE 2-continued

Slip and Gloss measurements of Coating Compositions using Nitrocellulose lacquer formulation of Table 1 and various Non-Flatting Slip-Enhancing Additives.

| Composition[1] | Gloss (ASTM D-523) (100 = glossy) 0.003 inch film thickness | | Coefficient of Friction (ASTM D-4518) | |
|---|---|---|---|---|
| | 20° | 60° | Static | Kinetic |
| Example 7 | 58 | 89 | 0.0826 | 0.0716 |
| Example 8 | 62 | 88 | 0.2540 | 0.3175 |

[1]Additive used at 1% level unless otherwise stated.
[2]Exceeds limit of detection
[3]Commercial polyethylene/polytetraflouroethylene wax slip additive (from Lubrizol/Langer) for reference
[4]Smooth, slippery feel
[5]Commercial silicone slip additive (from BYK Chemie) for reference The slip (coefficient of friction) and gloss measurements were performed according to established procedures (ASTM D-4518 and D-523 respectively). The results of Table 2 indicate all of the additives listed in the Table to have superior 60° gloss compared to the initial gloss of the coating, i.e., the coating with no slip additive. In addition, the experimental additives have better gloss than a commercial polyethylene/polytetrafluoroethylene wax (TF 1780) slip additive, and are comparable to a commercial silicone (Byk™ 300) slip additive. All of the additized samples have better slip performance (lower coefficient of friction) than the nonadditized control, and several appear to have improved slip performance over two commercial additives.

A polyester-melamine clear coil coating formulation and a polyester-melamine gloss white coil coating formulation are shown in Table 3 & 4 respectively.

TABLE 3

Gloss White Coil Coating, Polyester/Melamine*

| Raw Material Trade Name | Weight (kg) | % Non-volatile by Weight | Supplier | Identity of raw material |
|---|---|---|---|---|
| Dynapol LH818 | 238.78 | 50.00 | Hüls | Polyester Resin |
| R-960, TiO$_2$ | 102.36 | 100.00 | Du Pont | Titanium Dioxide |
| Aromatic 200 | 45.66 | 0.00 | Exxon | Solvent |
| Cymel 303 | 29.51 | 100.00 | Cytech | Melamine Crosslinker |
| Acrylic Flow Modifier | 1.81 | 50.00 | | |
| Epon 834 | 9.54 | 75.00 | Shell | Epoxide Resin |
| Dynapol BL 1203 | 5.38 | 50.00 | Hüls | Catalyst |
| Estrasol DBE | 20.58 | 0.00 | Chem Central | Solvent |
| Total Weight | 453.62 | | | |

*Lubrizol/Langer Product Literature

TABLE 4

Clear Coil Coating, Polyester/Melamine*

| Raw Material Trade Name | Weight (kg) | % Non-volatile by Weight | Supplier | Identity of raw material |
|---|---|---|---|---|
| Dynapol LH818 | 346.67 | 50.00 | Hüls | Polyester Resin |
| Estasol DBE | 14.93 | 0.0 | Chem Central | Solvent |
| Cymel 303 | 42.85 | 100.00 | Cytech | Melamine Crosslinker |
| Acrylic Flow Modifier | 1.81 | 50.0 | | |
| Epikote 834 | 10.39 | 75.0 | Shell | Epoxide Resin |
| Dynapol BI1203 | 7.80 | 50.0 | Hüls | Catalyst |
| Aromatic 200 | 28.58 | 0.0 | Exxon | Solvent |
| Total Weight | 453.03 | | | |

*Lubrizol/Langer product literature

The gloss and coefficient of friction results for the gloss white coil coating and the clear coating using the additive of example 1 are shown in Tables 5 and 6 below.

TABLE 5

Gloss White Coil Coating Results using Formulation of Table 3.

| Sample | Gloss (ASTM D-523) | | Coefficient of Friction | | Taber abrasion (ASTM D-4060) (mg) |
|---|---|---|---|---|---|
| | 20° Gloss | 60° Gloss | Static | Kinetic | |
| Control[1] | 84 | 97 | 0.1062 | 0.08973 | 5.55 |
| 0.5% Byk ™ 300[2] | 86 | 91 | 0.0576 | 0.0498 | 3.65 |
| 1% Byk ™ 300[2] | 68 | 91 | 0.0604 | 0.0482 | 4.15 |
| 0.5% additive of example 1 | 81 | 95 | 0.0738 | 0.0631 | 4.15 |
| 1% additive of example 1 | 63 | 90 | 0.0650 | 0.0555 | 3.20 |

Conditions: Drawn on Bonderite 1000 steel panel with a 2 mil bird bar; baked at 4 minutes @ 260° C. (500° F.); Quenched with water.
[1]No additive
[2]Commercial Silicone additive (BYK Chemie)

TABLE 6

Clear Coil Coating Results using Formulation of Table 4.

| Sample | Gloss (ASTM D-523) | | Coefficient of friction (ASTM D-4518) | | Taber abrasion (ASTM D-4060) (mg) |
|---|---|---|---|---|---|
| | 20° Gloss | 60° Gloss | Static | Kinetic | |
| Control[1] | 102 | 111 | 0.2131 | 0.2158 | 2.43 |
| 0.3% Byk ™ 300[2] | 106 | 119 | 0.1424 | 0.1398 | 2.25 |
| 0.5% Byk ™ 300 | 107 | 118 | 0.1220 | 0.1181 | 2.25 |
| 0.5% additive of example 1 | 104 | 116 | 0.1052 | 0.0801 | 1.30 |
| 1% additive of example 1 | 107 | 122 | 0.0755 | 0.0693 | 1.25 |

Conditions: Drawn on treated aluminum with a 2 mil bird bar; baked at 4 minutes @ 260° C. (500° F.); Quenched with water.
[1]no additive
[2]Commercial Silicone additive (BYK Chemie); recommended to be used at 0.3% for this formulation.

The data indicate that in both gloss white and clear coil formulations, the compositions with the additive of Example 1 have superior performance compared to the control formulation (i.e. composition without any slip additive).

Table 7 shows the powder coating formulation used in the evaluation of a preferred non-flatting slip-enhancing additive of this invention.

TABLE 7

Powder coating formulation used in evaluation of Non-Flatting Slip Additives.

| Raw Material Trade Name | A (Control) | B |
|---|---|---|
| Ruco ™ 102[1] | 56.86 | 56.01 |
| Ruco ™ NI-2[2] | 9.74 | 9.59 |
| Uraflow ™ B[3] | .40 | .40 |
| Acrylic Flow Modifier | 1.0 | 1.0 |
| Blancfixe Micro[4] | 30.0 | 30.0 |
| Additive of Example 1 | — | 1.0 |
| Special Black #4[5] | 2 | 2 |

[1]Polyester resin (Ruco Polymers);
[2]Isocyanate-containing curative (Ruco Polymer);
[3]Benzoin (release agent; GCA Chemical;
[4]Inert filler (precipitated $BaSO_4$; Sachleben (ORE Chemiscals))
[5]Carbon black pigment (Degrees)

Performance results are shown in Table 8.

TABLE 8

Test Results of Powder Coating Compositions of Table 7.

| Test Measurements | A | B |
|---|---|---|
| gloss (60°) (ASTM D523) | 87 | 86–87 |
| gloss (20°) (ASTM D523) | 48–50 | 55–57 |
| DOI (Distinction of Image) (ASTM E430-91 & E284) | 30 | 40 |
| Color CIELAB Spectral included (ASTM D2244-93) | — | –0.06 |
| DL | | |
| Da | — | –0.04 |
| Db | — | 0.07 |
| DE | — | 0.07 |
| Appearance (Visual) | Good | Good |
| Film build (mils) | 1.4–2.0 | 0.95–2.0 |
| Coefficient of Friction (ASTM D4518) | .1306 | .1102 |
| (Dynamic) Ave. | .1144 | .1043 |
| Standard deviation | 0.0110 | .0075 |

Cure: 15 minutes @ 190.6° C. (375° F.) in precision electric oven

Compared to the control formulation without any slip additive (formulation A), the results with the additive of Example 1 (formulation B) shows improved 20° gloss, equivalent 60° gloss, and improved slip properties (lower coefficient of friction).

The coating composition may contain a carrier. This could include organic solvents for organic coating compositions or water for aqueous coating compositions. The coating compositions can therefore be solvent-free, water-borne, organic solvent-borne, or a powder coating composition.

The non-flatting slip-enhancing additives of this invention can be used at a level of at least 0.01% by weight of the coating composition. Preferably they will be present at a level of 0.01 to 5%, or 0.1 to 3%, or 0.2 to 2% by weight of the coating composition.

The coating composition comprising the non-flatting slip-enhancing additives of this invention generally retain at least about 75% of the initial gloss in a coating composition containing a film-forming resin. The initial gloss refers to the gloss of a coating composition without the slip-enhancing additive. The gloss will be retained with the slip additive being incorporated at its optimum level as disclosed in the previous paragraph. More preferably 85–100% of the initial gloss may be retained, and the gloss may even be enhanced with the incorporation of the slip additive in the coating composition.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the amount, range, and ratio limits set forth herein may be combined. As used herein, the expression "consisting essentially of" permits the inclusion of substances which do not materially affect the basic and novel characteristics of the composition under consideration.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group above.

A "hydrocarbylene substituent" is a divalent analog of a "hydrocarbyl substituent".

What is claimed is:

1. A coating composition comprising:

A. a film-forming resin; and

B. a non-flatting slip-enhancing additive comprising the non cross-linked reaction product of:
   (a) an amine represented by the formula:
      (i) $NR^1R^2H$
      wherein $R^1$ and $R^2$ are independently selected from the group consisting of hydrocarbyl groups and hydroxyalkyl groups represented by the formula $$\begin{array}{c} R^3 \ \ R^4 \\ | \ \ \ | \\ -C-C-OH \\ | \ \ \ | \\ H \ \ H \end{array}$$

wherein $R^3$ and $R^4$ are independently hydrogen or a hydrocarbyl group; or (ii) D—(NGH)$_y$ wherein D is a multivalent organic radical having 2 to about 30 carbon atoms; each G independently is hydrogen, a hydrocarbyl group, or hydroxyalkyl group represented by the formula $$\begin{array}{c} R^3 \ \ R^4 \\ | \ \ \ | \\ -C-C-OH \\ | \ \ \ | \\ H \ \ H \end{array}$$

wherein $R^3$ and $R^4$ are defined as above; and y is at least 2; provided that if D is an organic radical containing 2 carbon atoms and y is 2, at least one G must be a hydrocarbyl group of 1 to 30 carbon atoms; and (b) a carboxylic acid of the formula B—(COOH)$_z$, or a reactive equivalent thereof, wherein B is a direct link between two COOH groups, a mono- or a multivalent organic radical, and z is 1–5; provided that if the carboxylic acid is a monocarboxylic acid represented by the formula RCOOH, wherein R is a hydrocarbyl group, said hydrocarbyl group is free of heteroatoms;

wherein the resulting product of (a) and (b) contains at least 2 hydrocarbyl groups each having about 12 to about 30 carbon atoms.

2. The composition of claim 1 wherein the amine is represented by the formula $NR^1R^2H$.

3. The composition of claim 2 wherein $R^1$ and $R^2$ are both hydrocarbyl groups of about 12 to about 30 carbon atoms; B is a monovalent organic radical having about 4 to about 100 carbon atoms; and z is 1.

4. The composition of claim 3 wherein the carboxylic is a straight chain carboxylic acid of about 12 to about 30 carbon atoms.

5. The composition of claim 4 wherein the amine is selected from the group consisting of dioctadecylamine, dicocoamine, di-(hydrogenated tallow) amine and mixtures thereof, and wherein the carboxylic acid is selected from the group consisting of stearic acid, lauric acid, myristic acid, palmitic acid, oleic acid, behenic acid and mixtures thereof.

6. The composition of claim 1, wherein the carboxylic acid is selected from the group consisting of dimer acids, trimer acids, and mixtures thereof.

7. The composition of claim 2 wherein $R^1$ and $R^2$ are both hydroxyalkyl groups represented by the formula $$\begin{array}{c} R^3 \ \ R^4 \\ | \ \ \ | \\ -C-C-OH \\ | \ \ \ | \\ H \ \ H \end{array}$$

wherein $R^3$ and $R^4$ are defined as above.

8. The composition of claim 7 wherein the amine is diethanolamine and the carboxylic acid is stearic acid.

9. The composition of claim 8 wherein the mole ratio of stearic acid to diethanolamine is about 2:1 to about 3:1.

10. The composition of claim 1 wherein the amine is represented by the formula D—(NGH)$_y$.

11. The composition of claim 10 wherein y is 2 and D is a divalent organic radical selected from the group consisting of hydrocarbylene groups of 2 to about 30 carbon atoms, and alkylene polyamines of the formula:

—(R$^5$NH)$_p$—R$^5$— wherein each $R^5$ is an alkylene group of 2 to 10 carbon atoms and p is 1 to about 10.

12. The composition of claim 10 wherein the amine is a polyether diamine.

13. The composition of claim 10 wherein the amine is represented by the formula

R$^6$NH(CH$_2$)$_n$NHR$^7$ wherein n is at least 2, and each R is independently hydrogen or hydrocarbyl; provided that if n is 2, at least one R must be hydrocarbyl.

14. The composition of claim 11 wherein the amine is selected from the group of consisting of 1,6-diaminohexane, N-tallow-1,3-diamino propane, and mixtures thereof.

15. The composition of claim 9 wherein the amine is represented by the formula:

$$\begin{array}{c} R^8 \\ | \\ R^{15}HN-R^{11}-C-R^{10}-NHR^{12} \\ | \\ R^9 \\ | \\ NHR^{14} \end{array}$$

wherein $R^6$, $R^{12}$, $R^{13}$, and $R^{14}$ are independently a hydrogen or a hydrocarbyl group of 1 to about 30 carbon atoms; $R^9$, $R^{10}$, and $R^{11}$ are independently an alkylene group of 1 to about 10 carbon atoms.

16. The composition of claim 15 wherein the amine is 4-aminomethyl-1,8-octanediamine.

17. The composition of claim 1 wherein said resin is selected from the group consisting of oil-free polyester resins, unsaturated polyester resins, urethane resins, acrylic resins, alkyd resins, epoxy resins, melamine-formaldehyde resins, urea-formaldehyde resins and nitrocellulose.

18. The composition of claim 1, further comprising a carrier.

19. The composition of claim 18 wherein the non-flatting slip-enhancing additive is used at a level of at least 0.01% by weight of the composition.

20. The composition of claim 17 wherein the non-flatting slip-enhancing additive is used at a level of 0.2% to about 2% by weight of the composition.

21. The composition of claim 1 wherein the coating composition is water-borne, organic solvent-borne, solvent free, or a powder coating composition.

* * * * *

UNITED STATES PATENT AND TRADEMARK OFFICE
CERTIFICATE OF CORRECTION

PATENT NO. : 5,780,401
DATED : July 14, 1998
INVENTOR(S) : Thomas F. Steckel

It is certified that error appears in the above-identified patent and that said Letters Patent is hereby corrected as shown below:

On the title page: Item [54] and Column 1, line 1,

--Non-Flatting Slip-Enhancing Additives for Coatings--

Signed and Sealed this

Tenth Day of November 1998

Attest:

BRUCE LEHMAN

*Attesting Officer*       *Commissioner of Patents and Trademarks*